US011068547B2

(12) United States Patent
Levy

(10) Patent No.: US 11,068,547 B2
(45) Date of Patent: *Jul. 20, 2021

(54) DYNAMIC SEARCH SET CREATION IN A SEARCH ENGINE

(71) Applicant: Ubunifu, LLC, Las Vegas, NV (US)

(72) Inventor: Michael A. Levy, Atlanta, GA (US)

(73) Assignee: Ubunifu, LLC, Las Vegas, NV (US)

( * ) Notice: Subject to any disclaimer, the term of this patent is extended or adjusted under 35 U.S.C. 154(b) by 206 days.

This patent is subject to a terminal disclaimer.

(21) Appl. No.: 16/243,486

(22) Filed: Jan. 9, 2019

(65) Prior Publication Data

US 2019/0147003 A1    May 16, 2019

Related U.S. Application Data

(63) Continuation of application No. 14/624,609, filed on Feb. 18, 2015, now Pat. No. 10,223,453.

(51) Int. Cl.
*G06F 16/24* (2019.01)
*G06F 16/951* (2019.01)
*G06F 16/00* (2019.01)
*G06F 16/28* (2019.01)

(52) U.S. Cl.
CPC ............ *G06F 16/951* (2019.01); *G06F 16/00* (2019.01); *G06F 16/285* (2019.01)

(58) Field of Classification Search
CPC ....... G06F 16/951; G06F 16/285; G06F 16/00
USPC ...................................................... 707/706
See application file for complete search history.

(56) References Cited

U.S. PATENT DOCUMENTS

| | | | | |
|---|---|---|---|---|
| 6,484,162 B1* | 11/2002 | Edlund | ............... | G06F 16/2428 |
| 6,917,972 B1* | 7/2005 | Basko | .................... | G06Q 30/02 |
| | | | | 709/223 |
| 7,035,925 B1* | 4/2006 | Nareddy | ................. | H04L 67/22 |
| | | | | 709/224 |
| 7,107,338 B1* | 9/2006 | Nareddy | ................. | H04L 67/22 |
| | | | | 709/224 |
| 7,162,691 B1* | 1/2007 | Chatterjee | ............. | G06F 16/951 |
| | | | | 715/205 |
| 7,937,402 B2* | 5/2011 | Feng | .................... | G06F 16/9537 |
| | | | | 707/759 |
| 8,712,999 B2* | 4/2014 | Holsman | ............... | G06F 16/951 |
| | | | | 707/721 |

(Continued)

*Primary Examiner* — Hanh B Thai
(74) *Attorney, Agent, or Firm* — Thomas | Horstemeyer, LLP

(57) ABSTRACT

Disclosed are various embodiments for dynamically generating a search set for use in a search application, such as a search engine, and using the search set to navigate collections of archived content. A request for user interface data is received from a client device in response to the client device attempting to access a domain. The domain may be parsed to identify a search category corresponding to one of the categories stored in a data store. Subcategories and search collections that are associated with the search category are identified and user interface data may be generated that cause at least a portion of the subcategories and search collections associated with a search component to be rendered in a display of the client device. The search component is configured to use a selected one of the at least a portion of the subcategories to narrow a search conducted using the search component by generating a narrowing search query.

20 Claims, 9 Drawing Sheets

(56) References Cited

U.S. PATENT DOCUMENTS

| | | | | |
|---|---|---|---|---|
| 9,047,614 B2* | 6/2015 | Kalikivayi | ......... | G06Q 30/0201 |
| 10,068,021 B1* | 9/2018 | Ferguson | .............. | G06F 16/164 |
| 10,346,442 B2* | 7/2019 | Beller | ................. | G06F 16/2228 |
| 2007/0288514 A1* | 12/2007 | Reitter | .................. | G06F 16/951 |
| 2013/0006914 A1* | 1/2013 | Ray | .......................... | G06N 5/02 |
| | | | | 706/50 |
| 2013/0132366 A1* | 5/2013 | Pieper | ................... | G06F 16/951 |
| | | | | 707/710 |
| 2014/0032263 A1* | 1/2014 | Kalikivayi | ............ | G06F 40/205 |
| | | | | 705/7.29 |
| 2015/0356203 A1* | 12/2015 | Allen | ................. | G06F 16/2477 |
| | | | | 707/725 |
| 2016/0267189 A1* | 9/2016 | Mi | ......................... | G06F 16/95 |

* cited by examiner

DYNAMIC SEARCH SET CREATION IN A SEARCH ENGINE

CROSS-REFERENCE TO RELATED APPLICATION

This application claims the benefit of and priority to U.S. patent application Ser. No. 14/624,609 entitled "DYNAMIC SEARCH SET CREATION IN A SEARCH ENGINE," filed Feb. 18, 2015, the contents of which being incorporated by reference in their entirety herein.

BACKGROUND

Traditionally, Internet searches are conducted by an average user by inputting various terms or keywords, referred to as a search query, in a search field associated with a search engine. After submitting the search query, the search engine may generate results comprising data or network addresses tailored to the search query. With the popularity of the Internet, search engines now generate thousands to hundreds of thousands of search results by searching large numbers of documents, the majority of which may not apply to the subject matter of the search. These search results are typically organized according to relevancy, popularity, etc. Navigating the vast amounts of search results is time consuming for an average user and a percentage of false positives returned in the search results is high.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
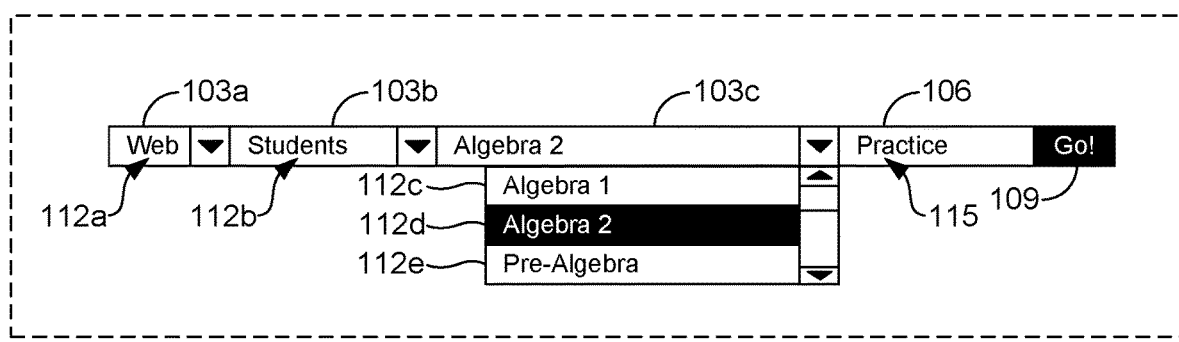
FIG. 1 is a drawing illustrating a search component for use in a user interface according to various embodiments of the present disclosure.

The present disclosure relates to dynamically generating search sets for use in a search application, such as a search engine, and using the search set to navigate collections of archived content. As discussed above, Internet searches are traditionally conducted by an average user by inputting various terms or keywords, referred to as a search query, in a search field associated with a search engine. After submitting the search query, the search engine generates results comprising data and/or network addresses tailored to the search query. With the popularity of the Internet, search engines now generate thousands to hundreds of thousands of search results by searching large numbers of documents, the majority of which do not apply to the subject matter of the search. These search results are typically organized according to relevancy, popularity, etc., but are not organized according to an algorithm or other method specified by the user. Navigating the vast amounts of search results is time consuming for an average user and a percentage of false positives returned in the search results is high.

Further, accurately searching large amounts of unstructured data is difficult as complexity grows and the amount of data grows. As more unstructured data, such as web pages, become searchable in an extensive database, confusion is created as web data can be easily taken out of context. Moreover, with respect to an enterprise search, the data not searched is just as important as the data that is searched. As search results become increasingly less relevant, the first attempt to remedy the situation is always to try to improve the search. This is done with the use of Boolean operators and search parameters and/or simply adding more terms. However, most people are not familiar with Boolean operators and advanced search parameters to construct these queries effectively and aren't familiar enough with the subject to matter to add more terms productively. For that matter, most people do not know that such advanced parameters exist or that adding terms would help with the search.

According to various embodiments of the present disclosure, subject matter topics are grouped into topic and subtopic relationships (hereinafter called "category" and "subcategory," respectively) as collections of data stored in memory. The category and the subcategory may be used for the creation of Boolean and parameter enhanced query strings and to help to quickly identify collections that may pertain to the search. The initial creation of categories and subcategories, which are collectively called "search sets," may be accomplished manually by an administrator and/or contributor or may be accomplished by a crawler application.

The categories, subcategories, and collections may be used to dynamically generate a search set for use in a search application, such as a search engine. As a request for user interface data is received from a client device in response to the client device attempting to access a domain, the domain may be parsed to identify a search category corresponding to one of the categories stored in a data store. Subcategories and collections that are associated with the search category are identified and user interface data may be generated that causes at least a portion of the subcategories associated with a search component to be rendered in a display of the client device, wherein the search component is configured to use a selected one of the at least a portion of the subcategories to narrow a search conducted using the search component by generating a narrowing search query.

In the following discussion, a general description of the system and its components is provided, followed by a discussion of the operation of the same.

With reference to FIG. 1, shown is a non-limiting example of a search component 100 according to various embodiments of the present disclosure. The search component 100 of FIG. 1 includes a plurality of dropdown menus 103a . . . 103c (collectively dropdown menus 103), a textbox 106, and a submit component 109 (exemplary labeled in FIG. 1 as "Go!"). Although repeatedly described herein as navigating archived web content, the search component 100 may be employed to navigate file systems, collections of documents, etc.

Each of the dropdown menus 103 may comprise a plurality of subcategories 112a . . . 112e (collectively subcategories 112) that may be associated with a particular category or keyword. For example, assuming the category of FIG. 1 were "math," the subcategories 112 shown in the dropdown menus 103 correspond to subcategories 112 of "math," such as "Web," "Students," "Algebra 1," Algebra 2," "Pre-Algebra," and so forth. The dropdown menus 103 may allow a selection of a single subcategory 112 or a selection of multiple subcategories 112. In some embodiments, the dropdown menus 103 are dropdown trees comprising a hierarchical structure in graphical form.

In various embodiments, the subcategories 112 shown in the dropdown menus 103 include subcategories 112 of a particular subcategory 112. For example, the subcategories 112c . . . 112e labeled "Algebra 1", "Algebra 2," "Pre-Algebra," may be subcategories of the subcategory 112b labeled "Students" which is a subcategory of the subcategory 112a labeled "Web." In these embodiments, as the user progresses from left to right, by selecting one or more subcategories 112 from the dropdown menus 103, the dropdown menus 103 may dynamically update to further narrow the search to a particular set of subcategories 112, thereby removing potentially irrelevant network sites from a search. Although the first subcategory 112a is labeled "Web," the first subcategory 112a (being the broadest in FIG. 3A) may also include other subcategories 112 such as "Images," "News," "Videos," "Social," or other similar subcategories 112.

The textbox 106 may be used to input keywords, phrases, characters, Boolean operators, etc., to define a search query according to the subcategories 112 potentially selected via the dropdown menus 103. The submit component 109 may be employed to initiate a search giving the parameters established by a user using the search component 100. For example, the search query "Practice," as shown in FIG. 1, may be conducted using the selected subcategories 112 of "Web," "Students," and "Algebra 2." The search query may be conducted to search archived web content, for example, stored in a data store.

In various embodiments, the search component 100 of FIG. 1 may be employed in a network page, such as a web page. In alternative embodiments, the search component 100 may be employed in a dedicated application (e.g., a mobile application executable on a mobile computing device), a web browser application plug-in, a standalone search application, document management software, an operating system, or in similar applications.

Figure 2:
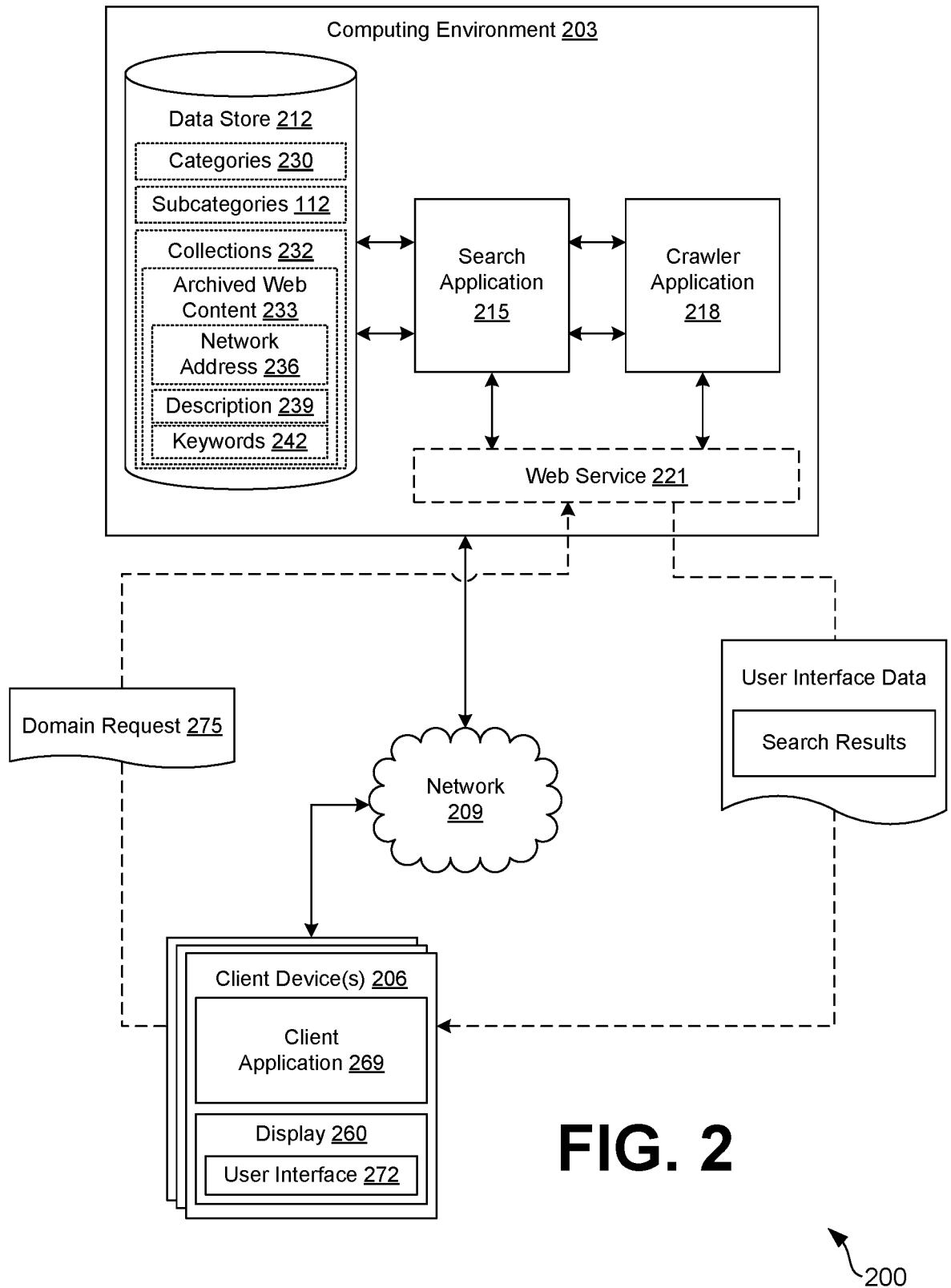
FIG. 2 is a drawing of a networked environment according to various embodiments of the present disclosure.

With reference to FIG. 2, shown is a networked environment 200 according to various embodiments. The networked environment 200 includes a computing environment 203 and a client device 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a search application 215, a crawler application 218, a web service 221, and other applications, services, processes, systems, engines, or functionality not discussed in detail herein.

The search application 215 is executed in order to facilitate an online or offline search of data over the network 209. The search application 215 also performs various backend functions associated with a presence of a search engine in order to facilitate the searching of data as will be described. For example, the search application 215 generates network pages such as web pages or other types of network content that are provided to client devices 206 for the purpose of facilitating a search, identification, and/or navigation of network sites as will be described. In various embodiments, the search application 215 searches only data stored in the data store 212. In alternative embodiments, the search application 215 uses a combination of data stored in the data store 212 as well as information accessed over the network 209.

The crawler application 218 is executed in order to access web pages as they are uploaded to the network 209 and generate data pertaining to the accessed web pages. To this end, the crawler application 218 may navigate network sites accessible over the network 209 to download network pages or documents hosted on the network sites and generate screen shots or screen captures of the network pages which may be subsequently stored in the data store 212. Further, the crawler application 218 may identify and/or generate keywords, descriptions, and/or other information associated with a network page to be stored in the data store 212.

The web service 221 is executed to provide a medium for communication between the computing environment 203 and one or more client devices 206 over the network 209. To this end, the web service 221 may comprise a web-based application programming interface (API) embodied in software that facilitates programmatic service calls (e.g., API calls) made by the client devices 206 to communicate with the search application 215, the crawler application 218, and/or other services or applications not described herein. According to various embodiments, the web-based API may further comprise a representational state transfer (REST) or a simple object access protocol (SOAP) API.

In various embodiments, the computing environment 203 may operate without the crawler application 218. This is accomplished by allowing one or more users to create contributor accounts, wherein the users contribute knowledge back into the system by suggesting more categories and subcategories to assist in the creation of the boolean and parameter based search queries. According to various embodiments, the contributor users may see a different set of buttons at the bottom of each search result that allows for the ability to add and subtract websites from the domains, subdomains, and collections that comprise the syntax. These edits may be reviewed by an administrator before being allowed to "go live" and be implemented in the operation of the computing environment 203. To this end, a majority of the search data sets may eventually be authored by sophisticated contributor users.

The data stored in the data store 212 includes, for example, categories 230, subcategories 112, and one or more collections 232 of archived web content 233. The categories 230 include keywords, labels, or other identifiers that may be used to narrow a search to a particular field of data. The categories 230 may be associated with one or more subcategories 112. Similarly, the subcategories 112 include keywords, labels, or other identifiers that may be used to further narrow a search to a particular field of data. The one or more collections 232 of archived web content 233 may include data obtained by the crawler application 218 or similar method. To this end, archived web content 233 includes a network address 236 such as a uniform resource locator (URL), a description 239, one or more keywords 239, source code, media content (e.g., images, meta data, and/or script code), or other data obtained from network pages or other network locations. The description 239 and/or the keywords 242 may be used in a query or a comparison of a search string to data residing in the data store 212 to identify relevant archived web content 233, as will be described in greater detail below. In various embodiments, the collections 232 may be created be users, administrators, and/or collaborators of the search application. The search application 215 may navigate these user-created collections 232 to perform certain searches using criteria provided by a user. To this end, performing a search on a first collection 232 may yield results different than the same search performed on a second collection 232.

In various embodiments, each of the collections 232 comprises data obtained by the crawler application 218 or provided by a collaborator of the search application 215. To this end, each of the collections 232 may comprise archived web content 233 and similar information stored in a file directory, a structured database (e.g., SQL), and/or a collection of databases. In various embodiments, each of the collections 232 has redundant data to facilitate performing fast searches in particular collections 232. For example, archived content 233 associated with a web page may be stored in association with a first collection 232 in the data store 212 as well as in association with a second collection 232 in the data store 212. In this embodiment, each of the collections 232 are stored in the data store 212 separate from other ones of the collections 232. However, in alternative embodiments, the crawler application 218 may store the archived content 233 at one location in the data store 232 and update the collections 232 to include indexes to the memory location of the archived content 233 for retrieval.

In various embodiments, a contributor (e.g., a user of the search application 215) may build his or her own collection 232 of archived web content 233. The contributors may define a query methodology, such as defining an order of search for the search application 215 when searching using a particular query in a particular collection 232. For example, a contributor may designate that the search application 215 should search a first set of data in the archived web content 233 before searching a second set of data if a user enters in a query predefined by the contributor (e.g., "Algebra"). To this end, the contributor acts as an "expert" in facilitating searches using the search application 215. In addition, the contributor may designate an order the crawler application 218 should follow when updating the collections 232 of archived web content 233.

The client device 206 is representative of a plurality of client devices that may be coupled to the network 209. The client device 206 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client device 206 may include a display 260. The display 260 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 206 may be configured to execute various applications such as a client application 269 and/or other applications. The client application 269 may be executed in a client device 206, for example, to access network content served up by the computing environment 203 and/or other servers, thereby rendering a user interface 272 on the display 260. To this end, the client application 269 may comprise, for example, a browser, a dedicated application, etc., and the user interface 272 may comprise a network page, an application screen, etc. The client device 206 may be configured to execute applications beyond the client application 269 such as, for example, email applications, social networking applications, word processors, spreadsheets, and/or other applications.

Next, a general description of the operation of the various components of the networked environment 200 is provided. To begin, it is assumed that a user desires to conduct a search for data and desires to limit one or more searches to a particular category, subject, topic, or keyword. Accordingly, the search component 100 employed in a user interface 272 may be populated according to a domain or a subdomain accessed by the user during which the user accesses to conduct a search. As a non-limiting example, a user may desire to search for articles related to muscle cars. Thus, the user can start his or her search from a domain specifically related to websites pertaining to automobiles, sports cars, or even a domain specifically related to muscle cars. Accordingly, the user may access a subdomain of a network site, such as a search engine, to limit a search to the websites pertaining to automobiles or muscle cars. As a non-limiting example, the subdomain may be similar to: "http://automobiles.search.site" or "http://www.search.site/automobiles," wherein "automobiles" may be described as the subdomain. In various embodiments, the subdomain is actually a high-level domain such as "http://www.automobilessearch.site."

The computing environment 203 maintains a subdomain for each category 230 in a data store 212. For example, if the categories 230 of "health," "news," "finance," "business," etc., are stored in the data store 212, the computing environment 203 may maintain a subdomain for each category 230, such as "http://health.search.site," "http:// news.search.site," "http://finance.search.site," "http://business.search.site" and/or "http://www.search.site/health," "http://www.search.site/news," "http://www.search.site/finance," "http://www.search.site/business." In various embodiments, a high-level domain is maintained for each category such as "http://www.healthsearch.site," "http://www.newssearch.site," "http://www.financesearch.site," "http://www.businesssearch.site."

A domain request 275 may be received by the computing environment 203 to access a document or webpage associated with the subdomain or the high-level domain. For example, when a user types into the client application 269 (or otherwise navigates to) "http://www.healthsearch.site," the computing environment 203 receives a request from the requesting client device 206 to receive or otherwise access the document associated with the domain.

The domain received in the domain request 275 is parsed to identify a search category. For example, the domain "http://finance.search.site," is parsed to identify the "finance" search category and the domain "http://business.search.site" is parsed to identify the "business" search category. To this end, keywords or other unique identifiers set forth in the domain may be compared to corresponding keywords, unique identifiers, collections 232, and/or categories 230 in the data store 212 to determine a matching search category. In various embodiments, the domain may be masked with a unique identifier such that a search category is not readily apparent to an end-user. For example, the domain "http://www.search.site/JFN3481," may be parsed to identify the unique identifier "JFN3481." This unique identifier may correspond to a particular category 230 as can be accessed from the data store 212. In various embodiments, the unique identifier may comprise a MD5 hash of the category 230 or any encrypted version of the keyword capable of decryption.

Next, any subcategories 112 associated with the search category may be identified, e.g., from the data store 212. For example, if the search category is "news," the subcategories 112 associated with news may comprise "world news," "local news," "politics," "sports," and so on. The identified subcategories 112 may be used in generating a user interface 272 that may allow the user to further narrow his or her search. In various embodiments, the subcategories 112 may be populated in one or more of the dropdown menus 103 (FIG. 1), as shown in the search component 100 of FIG. 1. To this end, the user interface 272, or user interface data, may be generated to cause the requesting computing device to render the user interface 272 comprising the subcategories in the one or more dropdown menus 103. For example, an HTML or XML document may be generated such that the dropdown menu 103 comprises the subcategories 112:

```
<html>
    ...
    <ul>
        <li>World News</li>
        <li>Local News</li>
        <li>Politics</li>
        <li>Sports</li>
    </ul>
    ...
</html>
```

The client device 206 may communicate whether a subcategory 112 has been selected in the user interface 272. If a subcategory 112 is not selected, a search is still able to be conducted relative to the search category. As may be appreciated, a search request may comprise a search query including search terms, keywords, Boolean operators, etc., that may be used to search the archived web content 233. The archived web content 233 may be searched using at least a portion of the search query, the selected subcategories 112 (if applicable), or a selected one of the collections 232. The search query may be conducted using a structured query language (SQL), or a similar language. As may be appreciated, the search results may be encoded in user interface data for rendering in the display 260 of the client device 206.

Figure 3A:
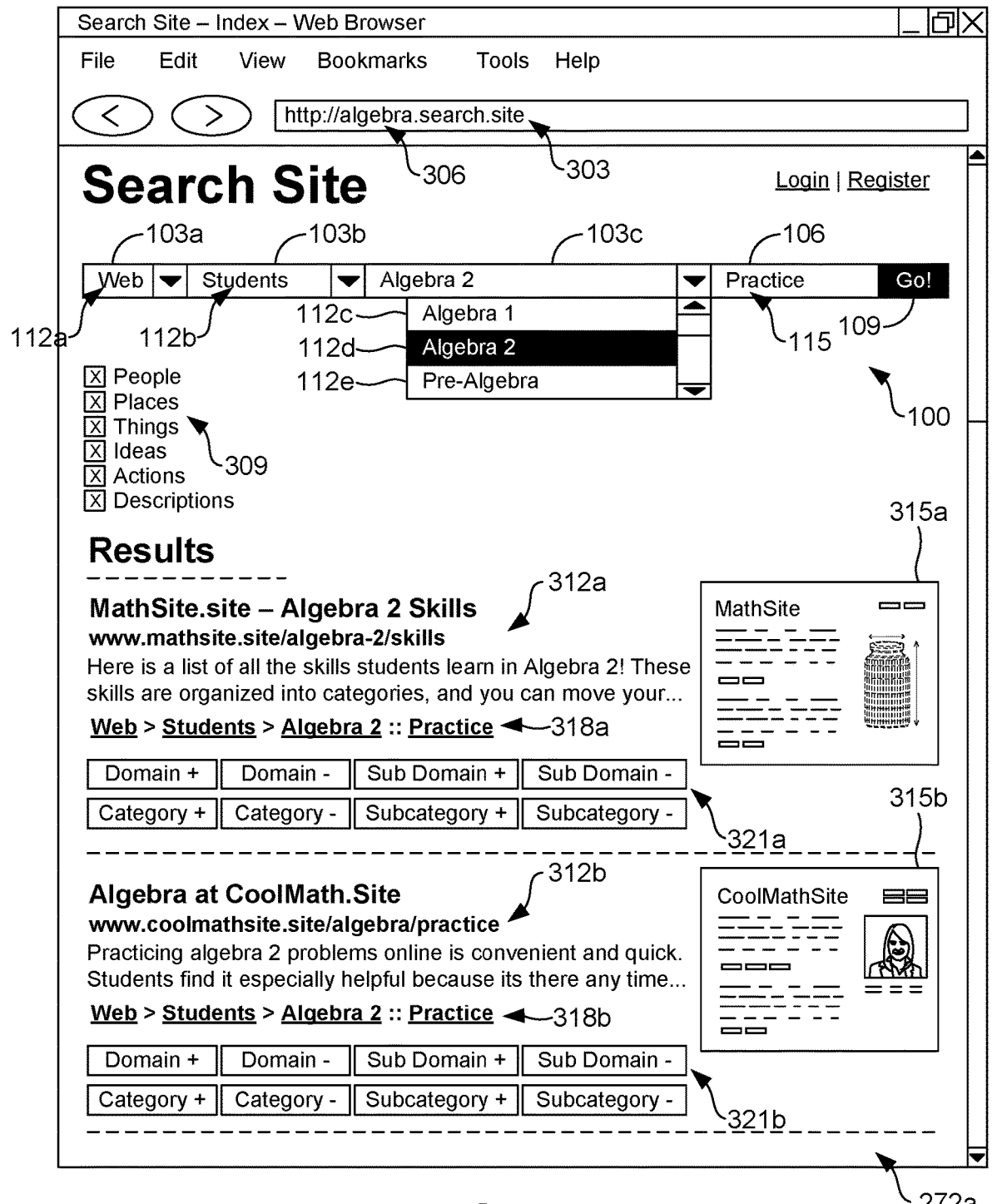
FIGS. 3A-B are example user interfaces comprising the search component of FIG. 1 rendered by a client device in the networked environment of FIG. 2 according to various embodiments of the present disclosure.

Turning now to FIG. 3A, shown is a non-limiting example of a user interface 272a comprising the search component 100 (FIG. 1) according to various embodiments of the present disclosure. As discussed above, the search component 100 may include the plurality of dropdown menus 103a . . . 103c (collectively dropdown menus 103), the textbox 106, and the submit component 109 (exemplary labeled in FIG. 3A as "Go!"). Each of the dropdown menus 103 may comprise subcategories 112a . . . 112e (collectively subcategories 112) that may be associated with a particular category, collection 232, or keyword.

During a generation of the user interface 272a by the computing environment 203 (FIG. 2), the domain or subdomain accessed by the user via the client application 269 (FIG. 2) (e.g., a web browsing application) may be parsed to identify a search category associated with the domain. In the non-limiting example of FIG. 3A, a domain 303 (i.e., "http://www.search.site") and/or a subdomain 306 (i.e., "http://algebra.search.site") is parsed to identify a search category labeled "algebra" included in the domain 303 or subdomain 306. Assuming the search category is "algebra," the subcategories 112 shown in the dropdown menus 103 of FIG. 3A correspond to subcategories 112 of "algebra," such as "Web," "Students," "Algebra 1," "Algebra 2," "Pre-Algebra," and so forth. Further, the subcategories 112c . . . 112e labeled "Algebra 1", "Algebra 2," "Pre-Algebra," may be subcategories of the subcategory 112b labeled "Students" which is a subcategory of the subcategory 112a labeled "Web." In these embodiments, as the user progresses from left to right, by selecting one or more subcategories 112 from the dropdown menus 103, the dropdown menus 103 may dynamically update to further narrow the search to a particular set of subcategories 112, thereby removing potentially irrelevant network sites from a search.

The textbox 106 may be used to input keywords, phrases, characters, Boolean operators, etc., to define a search query according to the subcategories 112 potentially selected via the dropdown menus 103. The submit component 109 may be employed to initiate a search giving the parameters established by a user using the search component 100. For example, the search query "Practice," as shown in FIG. 1, may be conducted using the selected subcategories 112 of "Web," "Students," and "Algebra 2." The search query may be conducted to search archived web content, for example, stored in a data store.

According to various embodiments, as a user enters characters or search terms in the textbox 106, suggested searches may be presented to the user. For example, as a user enters the characters "P" and "r," the suggested word of "Practice" may be suggested to the user in a separated dropdown menu 103 (e.g., located below or around the textbox 106) based on a popularity or relevancy of prior searches conducted by one or more users with respect to the search category, subcategory 112, and/or collections 232 identified from the domain 303.

The user interface 272a of FIG. 3A may comprise additional components to further narrow a search, as may be appreciated. For example, a descriptor component 309 may comprise one or more checkboxes that permits the user to narrow the search to "People," "Places," "Things," "Ideas," "Actions," and/or "Descriptions." As the user unchecks a box, the corresponding descriptor is removed from the search. For example, if the user were to uncheck the checkbox corresponding to "People," the search conducted via the search component 100 would exclude people from the search. According to various embodiments, the search may be further limited to web pages, images, multimedia, blog posts, reviews, tweets, and/or social information. If the information type selected by a user indicates that additional information is needed, it may be solicited from the user. Any selections made by the user may be incorporated into the search query.

Assuming a user were to manipulate or otherwise engage the submit component 109, one or more search results 312a . . . 312b (collectively search results 312) may be presented to the user based on the search parameters set forth by the user in the search component 100. In various embodiments, the search results 312 may be dynamically added to the user interface 272a without requiring a refresh of the user interface 272a using asynchronous javascript and extensive markup language (AJAX) or a similar medium. Each of the search results 312 may comprise a network address (e.g., a URL) to a third-party network site, a description of the third-party network site, and/or one or more screen captures 315a . . . 315b (collectively screen captures 315) of the third-party network site. As may be appreciated, the information shown in the search results 312 may be information obtained from the data store 212, such as the archived web content 233 (FIG. 2) obtained via the crawler application 218 (FIG. 2).

Further, each of the search results 312 may comprise a "breadcrumb" component 318a . . . 318b (collectively breadcrumb components 318) that provide detail as to how what parameters were placed in the search component to obtain a corresponding search result 312. For example, with respect to search result 312a, the breadcrumb component 318a illustrates that the user engaged the subcategories 112 for "Web," "Students," "Algebra 2," and entered into the textbox 106 the search string "Practice" when conducting the search. According to various embodiments, each of the search results 312 may further comprise one or more suggestion components 321a . . . 321b (collectively suggestion components 321), to facilitate further searches by recommending whether the domain 303, the subdomain 306, the category 230, and/or the subcategory 112, should be added or removed from the data store 212. According to various embodiments, the suggestion components 321 may only be made available to contributor users authorized by an administrator.

Figure 3B:
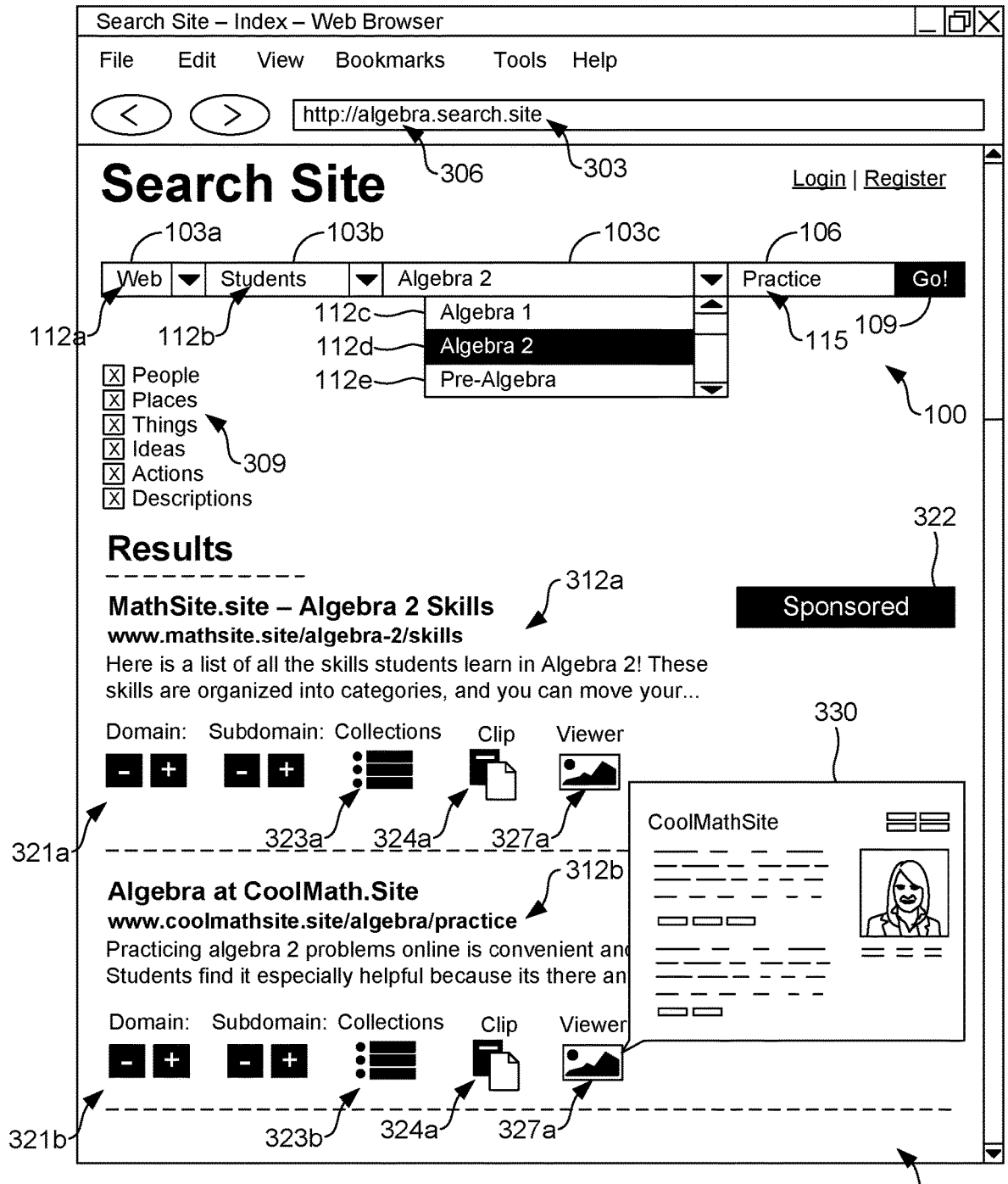

Moving on to FIG. 3B, shown is another non-limiting example of a user interface 272b according to various embodiments of the present disclosure. Assuming a user were to manipulate or otherwise engage the submit component 109, one or more search results 312a . . . 312b (collectively search results 312) may be presented to the user based on the search parameters set forth by the user in the search component 100. In various embodiments, the search results 312 may be dynamically added to the user interface 272b without requiring a refresh of the user interface 272b using AJAX or a similar medium. Each of the search results 312 may comprise a network address (e.g., a URL) to a third-party network site, a description of the third-party network site, and/or one or more screen captures 315a . . . 315b (collectively screen captures 315) of the third-party network site. As may be appreciated, the information shown in the search results 312 may be information obtained from the data store 212, such as the archived web content 233 (FIG. 2) obtained via the crawler application 218 (FIG. 2).

According to various embodiments, each of the search results 312 may comprise one or more suggestion components 321a . . . 321b (collectively suggestion components 321), to facilitate further searches by recommending whether the domain 303, the subdomain 306, the category 230, and/or the subcategory 112, should be added or removed from the data store 212 for the corresponding search result 312. The suggestion components 321a . . . 321b may comprise a collections component 323a . . . 323b that, when manipulated, causes a corresponding search result 312 to be added to a collection 232, such as an existing collection 232 or a new collection 232. In some embodiments, a portion of the search results 312 may be sponsored data (e.g., a fee exchanged for a promotion of the web site in the search application 215). A sponsored item indicator 322 may be shown in association with a search result 312 to indicate to a user that the search result 312 is sponsored content.

In the non-limiting example of FIG. 3B, each of the search results 312 comprises a clipboard component 324a . . . 324b and a viewer component 327a . . . 327b. According to various embodiments, a manipulation of the clipboard component 324 may cause a copying of all or a portion of the search results 312 to a clipboard of an operating system of the client device, for example, using javascript or a similar script. The portion of the search results 312 may include, for example, a name of the web site, a URL of the web site, a description of the web site, and/or the domain or subdomains associated with the web site. Similarly, in other embodiments, a manipulation of the clipboard component 324 may copy all or a portion of the search results 312 to a user profile of the user.

In various embodiments, a manipulation of the viewer component 327 may cause a dialog 330 (or a similar pop-up user interface component) to display a visual representation of the archived web content 233 including an i-frame comprising the web site (user interface 272b will actively access the URL of the web site in the i-frame) and/or a screen capture 315 of the web site. The screen capture 315 may be created by the crawler application 218 as the content is stored in the data store 215 or, in other embodiments, a separate application may create screenshots of the web site "on the fly" in response to a manipulation of the viewer component 327 or in response to the URL of the web site appearing in the search results 312.

Figure 4:
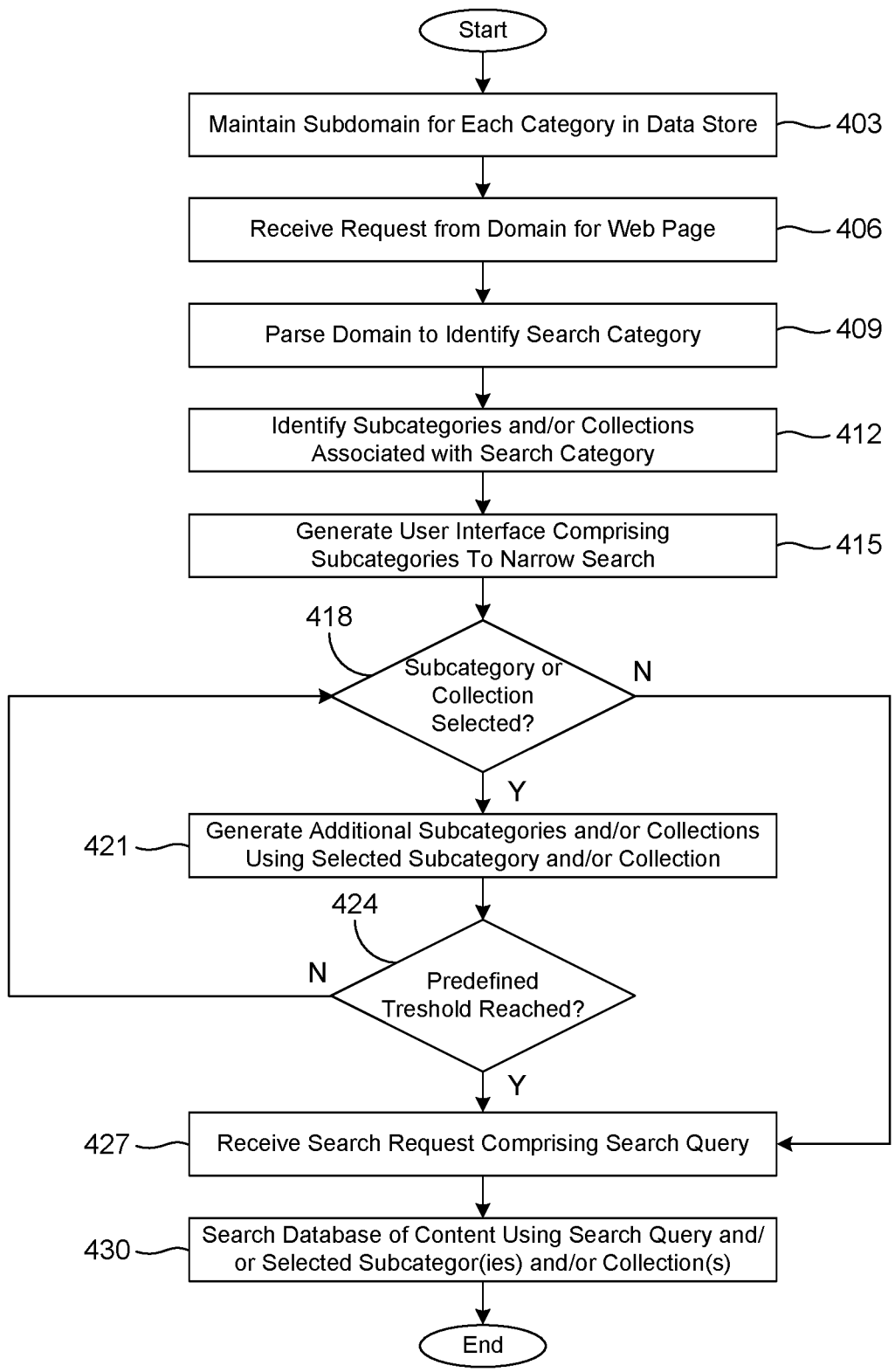
FIG. 4 is a flowchart illustrating one example of functionality implemented as portions of a search application executed in a computing environment in the networked environment of FIG. 2 according to various embodiments of the present disclosure.

Referring next to FIG. 4, shown is a flowchart that provides one example of the operation of a portion of the search application 215 according to various embodiments. It is understood that the flowchart of FIG. 4 provides merely an example of the many different types of functional arrangements that may be employed to implement the operation of the portion of the search application 215 as described herein. As an alternative, the flowchart of FIG. 4 may be viewed as depicting an example of elements of a method implemented in the computing environment 203 (FIG. 2) according to one or more embodiments.

To begin, it is appreciated that a user desires to limit searches to a particular category, subject, topic, or keyword. Accordingly, the search component 100 (FIG. 1) in a user interface 272 (FIG. 2) may be populated according to a domain or a subdomain accessed by the user during which the user accesses to conduct a search. As a non-limiting example, a user may desire to search for articles related to osteoporosis. Thus, the user can start his or her search from a domain specifically related to websites pertaining to health, well-being, or even a domain specifically related to osteoporisis. Accordingly, the user may access a subdomain of a network site, such as a search engine, to limit a search to the websites pertaining to health or well-being. As a non-limiting example, the subdomain may be similar to: "http://health.search.site" or "http://www.search.site/health," wherein "health" may be described as the subdomain. In various embodiments, the subdomain is actually a high-level domain such as "http://www.healthsearch.site."

Beginning with 403, a computing environment 203 may maintain a subdomain for each category in a data store 212. For example, if the categories "health," "news," "finance," "business," etc., are stored in the data store 212, the computing environment 203 may maintain a subdomain for each category, such as "http://health.search.site," "http://news.search.site," "http://finance.search.site," "http://business.search.site" and/or "http://www.search.site/health," "http://www.search.site/news," "http://www.search.site/finance," "http://www.search.site/business." In various embodiments, a high-level domain is maintained for each category such as "http://www.healthsearch.site," "http://www.newssearch.site," "http://www.financesearch.site," "http://www.businesssearch.site."

In 406, a request may be received by the computing environment 203 to access a document or webpage associated with the subdomain or the high-level domain. For example, when a user types into a web browsing application (or otherwise navigates to) "http://www.healthsearch.site," the computing environment 203 receives a request from a requesting computing device to receive or otherwise access the document from the domain.

In 409, the domain received in the request is parsed to identify a search category. For example, the domain "http://finance.search.site," is parsed to identify the "finance" search category and the domain "http://business.search.site" is parsed to identify the "business" search category 230. To this end, keywords or other unique identifiers set forth in the domain may be compared to corresponding keywords, collections 232, and/or unique identifiers in the data store 212 to determine a matching search category 230. In various embodiments, the domain may be masked with a unique identifier such that a search category 230 and/or collection 232 is not readily apparent to an end-user. For example, the domain "http://www.search.site/JFN3481," may be parsed to identify the unique identifier "JFN3481." This unique identifier may correspond to a particular category and/or collection as can be accessed from the data store 212. In various embodiments, the unique identifier may comprise a MD5 hash of the keyword and/or collection or otherwise any encrypted version of the keyword and/or collection capable of decryption.

In 412, any subcategories 112 and/or user-defined collections 232 associated with the search category may be identified, e.g., from the data store 212. For example, if the search category 230 (identified in 409) is "news," the subcategories associated with news may comprise "world news," "local news," "politics," "sports," and so on. In another example, a user may have created a collection of archived content (e.g., web pages, images, scripts, or other archived content). In 415, the identified subcategories may be used in generating a user interface 272 that may allow the user to further narrow his or her search. In various embodiments, the subcategories may be populated in one or more of the dropdown menus 103, as shown in the search component 100 of FIG. 1. To this end, the user interface 272, or user interface data, may be generated to cause the requesting computing device to render the user interface 272 comprising the subcategories in the one or more dropdown menus 103. For example, an HTML or XML document may be generated such that the dropdown menu 103 comprises the subcategories:

```
<html>
    ...
    <ul>
        <li>World News</li>
        <li>Local News</li>
        <li>Politics</li>
        <li>Sports</li>
    </ul>
    ...
</html>
```

In 418, the client device 206 may communicate whether a subcategory 112 or a user-defined collection 232 has been selected in the user interface 272. If so, the process may proceed to 412 where additional subcategories 112 or sub-collections 232 may be generated for the selected subcategory 112 or selected collection 232. For example, a selection of the subcategory 112 "Local News," may generate additional subcategories, such as "Local Politics," "Local Sports," etc., or identify contributors that have collections 232 that pertain to those subcategories. The additional subcategories 112 and collections 232 may be encoded in additional dropdown menus 103. In various embodiments, the additional subcategories are generating in the user interface 272 without a refreshing of the network page utilizing AJAX or a similar medium. Additional subcategories may be generated, as shown in 421, until a predefined threshold has been reached, as shown in 424. As may be appreciated, the predefined threshold may comprise a value stored in the data store 212, e.g., by an administrator of the search application 215.

Referring back to 418, if a subcategory 112 or a collection 232 is not selected, a search is still able to be conducted relative to the search category 230 identified in 409. Accordingly, in 427, whether or not a subcategory 112 has been selected, the computing environment 203 may receive a search request comprising a search query. As may be appreciated, the search query may comprise search terms, keywords, Boolean operators, etc., that may be used to search a database or a collection 232 of web sites. In 430, the database may be searched using at least a portion of the search query and/or the selected subcategories (if applicable). The search query may be conducted using a structured query language (SQL) or a similar language. As may be appreciated, the search results may be encoded in user interface data for rendering in the display 260 of the client device 206.

Figure 5A:
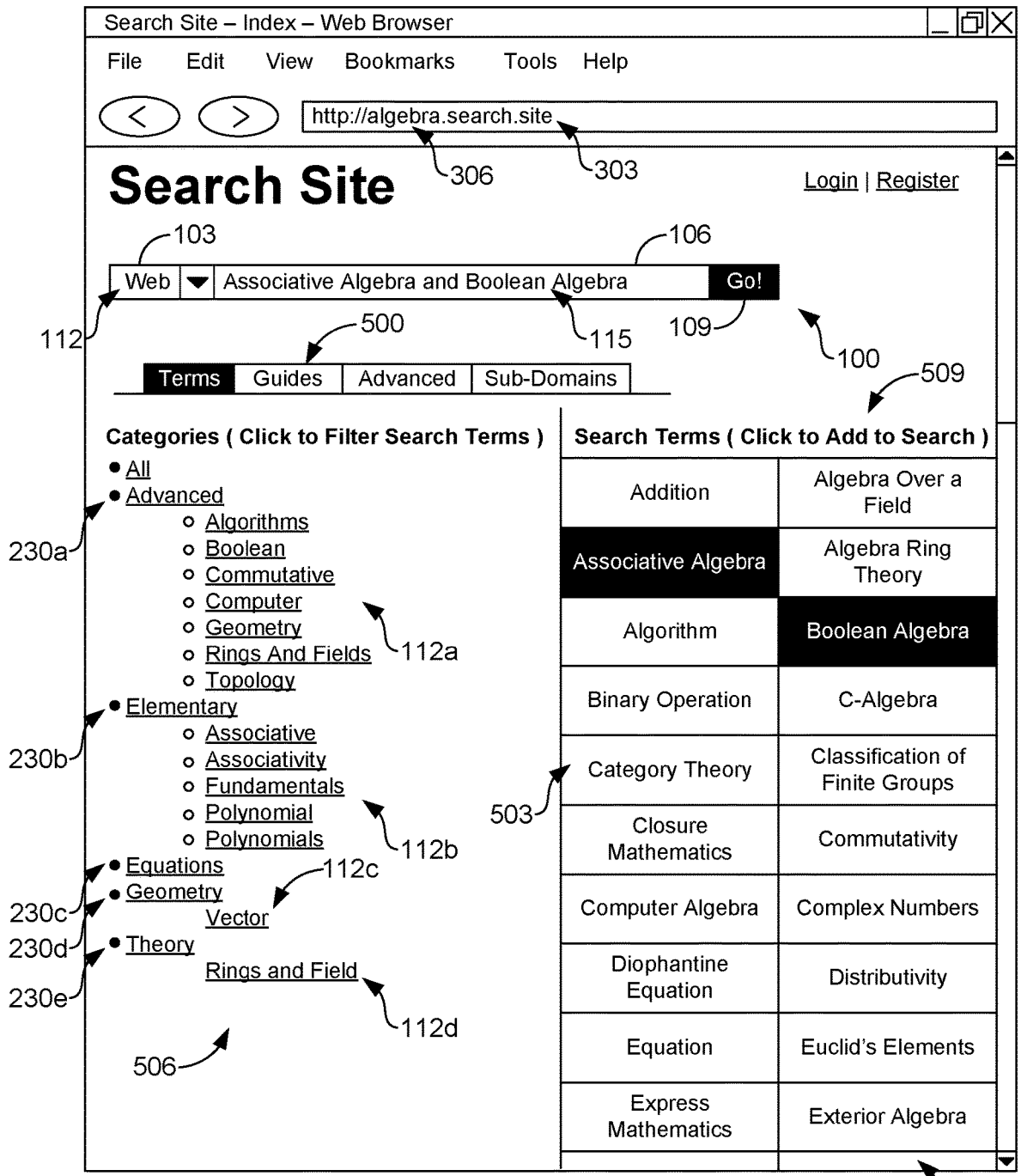
FIGS. 5A-C are example user interfaces comprising the search component of FIG. 1 rendered by a client device in the networked environment of FIG. 2 according to various embodiments of the present disclosure.

Moving on to FIG. 5A, shown is a non-limiting example of a user interface 272a comprising the search component 100 of FIG. 1 according to various embodiments of the present disclosure. In the non-limiting example of FIG. 5A, the "Terms" one of the tabs 500 is selected to show a plurality of search terms 503, as will be described. In various embodiments, the search component 100 may include one or more dropdown menus 103, the textbox 106 used for inputting search terms and queries, and the submit component 109 (exemplary labeled in FIG. 5A as "Go!"). As noted above, the one or more dropdown menus 103 may comprise subcategories 112 that may be associated with a particular category or keyword.

The textbox 106 may be used to input keywords, phrases, characters, Boolean operators, etc., to define a search query according to the subcategories 112 potentially selected via the dropdown menus 103. The submit component 109 may be employed to initiate a search giving the parameters established by a user using the search component 100. For example, a search using the search query "Associative Algebra and Boolean Algebra," as shown in FIG. 5A, may be performed using the selected subcategory 112 of "Web." The search using the query may be conducted to search archived web content, for example, stored in the data store 212 (FIG. 2).

In the non-limiting example of FIG. 5A, a plurality of search terms 503 may be shown in the user interface 272a to facilitate a selection of potentially relevant search terms 503. In various embodiments, the search terms 503 may be organized by category 230 and subcategory 112. By selecting a one category 230 from a plurality of categories 230a . . . 230e, or by selecting a subcategory 112 from a plurality of subcategories 112a . . . 112d, suggested search terms 503 are dynamically shown in the user interface 272a that may span the user interface 272a (e.g., vertically and/or horizontally). Users can scroll through the suggested search terms 503. As a result, hundreds or even thousands of search terms 503 may be presented to a user quickly and in an organized manner. This provides non-limiting benefits to users who do not to know anything about the topic to start browsing terms that are organized in a manner that is understandable, and the volume of terms displayed is sufficient that both popular and obscure terms are quickly apparent by just scanning the page visually.

In various embodiments, the search terms 503 may be shown in the user interface 272a using color-coding, text styling (e.g., bold, italics, underline, strikethrough) and non-styling methods like badges and star systems. In various embodiments, the search terms 503 may be shown in different font sizes based at least in part on their relevance. For example, more relevant search terms 503 may be shown in a font size larger than less relevant search terms 503. The styling employed may distinguish popularity and relevance of each search term 503 so the user can quickly discern a level of importance of each of the search terms 503.

In various embodiments, hovering over and/or clicking on the search terms 503 presents additional information in the user interface 272a related to the manipulated search term 503. Information can include, but is not limited to, definitions, similar search terms 503, drill-downs to other domains 303, sub-domains 306, categories 230, subcategories 112, other spellings of the search term 503, etc. In various embodiments, hovering over a search term 503 shows a dialog comprising applicable or corresponding collection 232. This may facilitate the searching of relevant and applicable collections 232.

In various embodiments, the search terms 503 may be sorted and organized alphabetically, by popularity, by relevance, by contributors who advise using the term, by term type (academic, cultural, general), etc. When search terms 503 are selected or otherwise manipulated, they are added to the textbox 115. As a result, search terms 503 can be combined and modified once in the textbox 115.

The user interface 272a of the non-limiting example of FIG. 5A has two notable components: a category/subcategory tree 506 and a terms display 509. By clicking on or otherwise manipulating a category 230 in the category/subcategory tree 506, the search terms in that category 230 may be dynamically updated in the terms display 509 (e.g., without a refresh of the user interface 272a or a network page). By clicking on a subcategory 112, the search terms 503 in the terms display 509 may be refined to just that subcategory 112. In some embodiments, upon an initial page load, all search terms 503 are displayed (e.g., search terms 503 associated with the subcategory 112 shown in dropdown box 103). This may be the same as clicking the "All" node at the top of the category/subcategory tree 506. In addition, the category/subcategory tree 506 can also contain relevance, popularity, rating, and specialty based branches. This allows the user to select terms based on criteria.

Figure 5B:
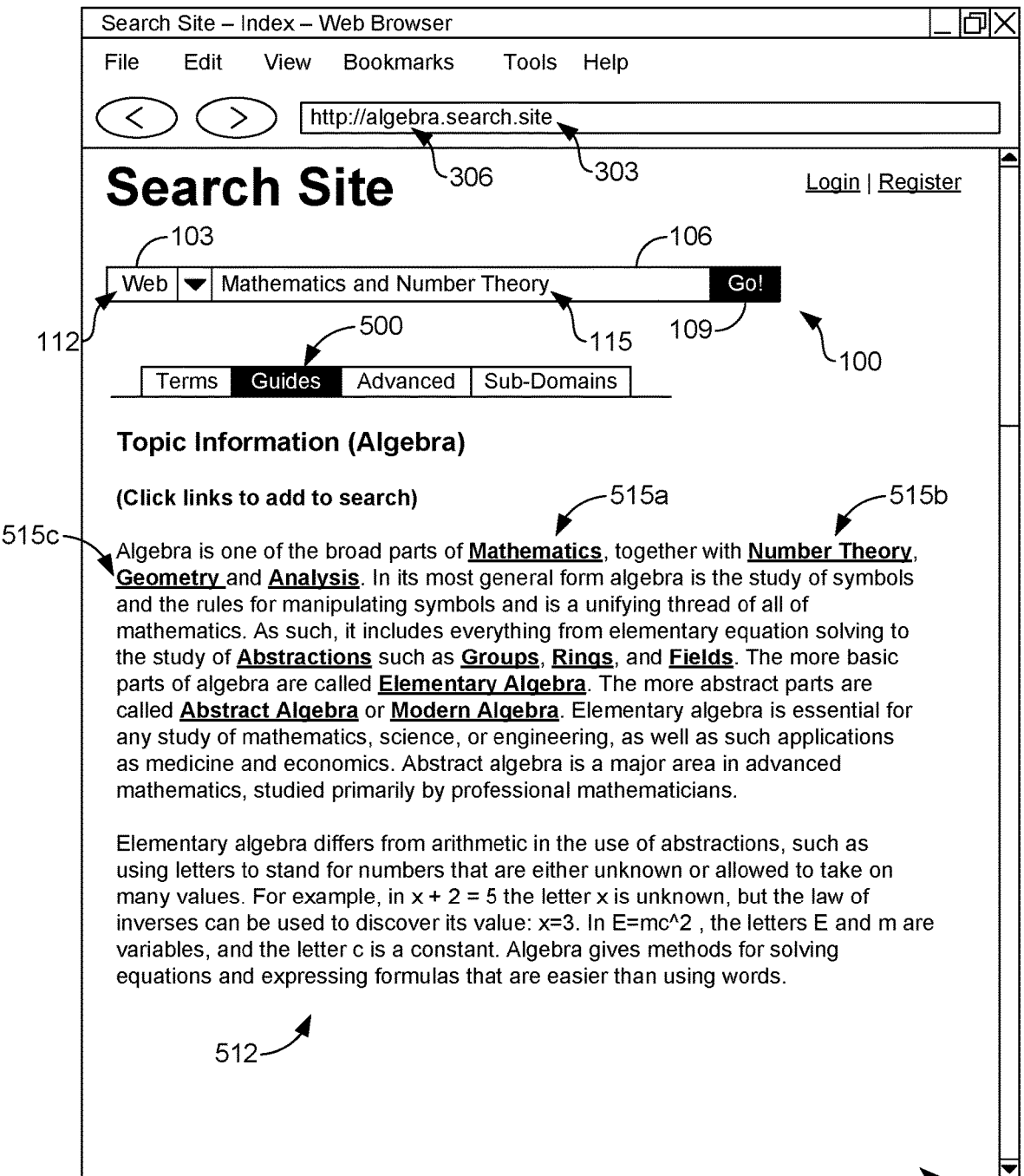

Moving on to FIG. 5B, shown is a non-limiting example of a user interface 272b comprising the search component 100 of FIG. 1 according to various embodiments of the present disclosure. In the non-limiting example of FIG. 5B, the "Guides" one of the tabs 500 is selected to show topic information 512, as will be described. In various embodiments, the search component 100 may include one or more dropdown menus 103, the textbox 106 used for inputting search terms and queries, and the submit component 109 (exemplary labeled in FIG. 5 as "Go!"). As noted above, the one or more dropdown menus 103 may comprise subcategories 112 that may be associated with a particular category or keyword.

The user interface 272b may be employed in a narrative based search, where topic information 512, comprising a text explanation of the subject, is accessed from the data store 212 or from an external service (e.g., Wikipedia®). The topic information 512 may be parsed to identify categories 230, subcategories 112, or other useful search terms 503 (FIG. 5A) turn the text explanation of the subject into a search assistant that represents the use of search terms 503 or other search criteria in a natural, explanatory manner. When certain selectable content 515a . . . 515c of the topic information 512 (e.g., text, images, diagrams, and/or other representations) are clicked or otherwise manipulated, the selectable content 515 may be added to the textbox 115 for use in a search query. Similar to the description of FIG. 5A, hovering over a term, image, diagram, etc., will cause rendering of additional information, for example, in a pop-up box and/or allow drill downs. Other terms may be added to the textbox 115 and/or the search query may be modified before the user executes the search by manipulating the submit component 109.

Figure 5C:
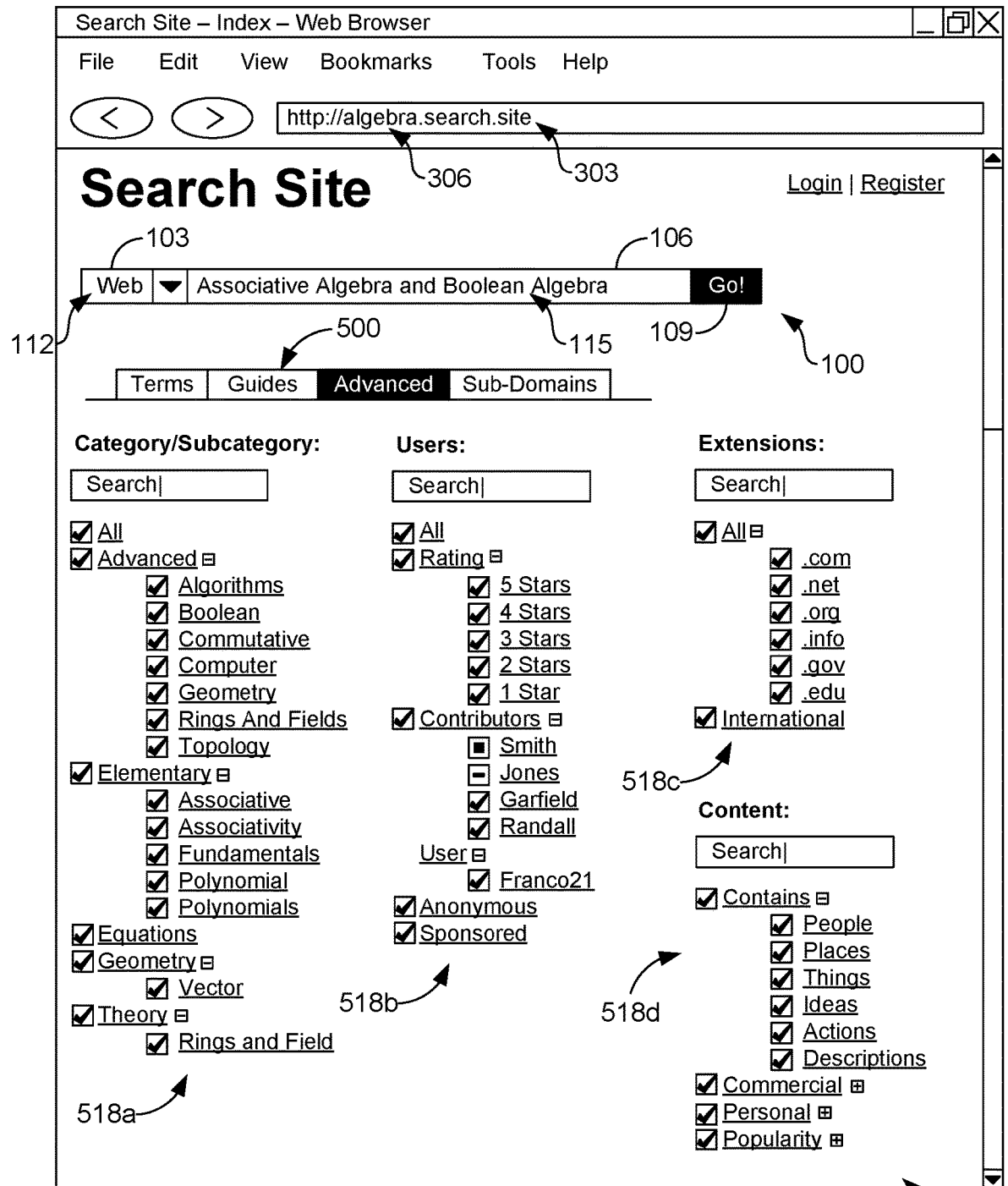

Moving on to FIG. 5C, shown is a non-limiting example of a user interface 272c comprising the search component 100 of FIG. 1 according to various embodiments of the present disclosure. In the non-limiting example of FIG. 5C, the "Advanced" one of the tabs 500 is selected to show one or more data set modification trees 518a . . . 518d (collectively data set modification trees 518), as will be described. In various embodiments, the search component 100 may include one or more dropdown menus 103, the textbox 106 used for inputting search terms and queries, and the submit component 109 (exemplary labeled in FIG. 5C as "Go!").

According to various embodiments, a data set modification tree 518 may employ a four state check box within each branch. For example, the four state check boxes have the following values: checked, un-checked, out-checked, and mixed. This uses a common check symbol with which searchers may be familiar. A checked box next to a category 230, subcategory 112, or search term 503 (FIG. 5A) includes a branch or a node in a search. An un-checked box does not include the branch or the node in the search, while not filtering out the contents of the branch from the search assuming those contents are contained in other included (checked) branches. An out-checked box, for example, comprising a minus sign, may filter out (remove) the contents of the branch from a search and/or search results if they happen to occur within branches that are included (checked). A mixed box (block) may be employed to use for branches that have lower hierarchies where the states of the branches underneath are a mixture of the other states.

As a result of using four state check boxes in the data set modification tree 518 makes an easy and quick way to communicate what should be done with multiple branches of the data set modification tree 518 in two capacities. The branches of the data set modification tree 518 represent such structures as categories 230, sub-categories 112, domains, sub-domains, contributors, search data, search terms 503, search data content attributes, geolocation, ratings, and more. A multitude of possible structures that can be represented by branches may be appreciated. When users select branches on the data set modification tree 518, the search data sets, filters, and even a search algorithm can update accordingly.

Fortunately, using a four state check box eliminates the possibility that a user will both include and exclude the exact same branch. At times, certain categories 230 and subcategories 112 may cancel each other out as searching two conflicting search data sets may not be the best method. In this event, a warning notification may be produced, thereby giving the user the option to remove some of the categories 230 and subcategories 112. Likewise, if selecting one category 230 or subcategory 112 indicates that searching an additional category 230 or subcategory 112 is beneficial, or that an exclusion may be helpful to place on a searched set of branches, the system will make the necessary suggestion.

Notably, the search engine evaluates the branches selected on all of the data set modification trees 518a . . . 518d for a query. As may be appreciated, the search queries can become quite complex. For example, the more branches included and excluded on the one or more data set modification trees 518, the more server power is required and/or the longer it takes to return search results even when the search data set is limited to a domain/subdomain. To remedy this problem, users can search within specific collections created by contributors.

Contributor collections permit contributors to add and/or subtract search data to and from categories 230, sub-categories 112, domains, sub-domains, etc., by creating custom search data sets which other users can use to search. These search data sets are referred to as "collections" and contributors can name these collections for organization. These collections can be used to specify search data sets to add, subtract, and give higher and lower weight (or authority) to search data contents to apply to search results. Further, contributors can include other collections within their collections to create collection search sets. These sets essentially give advice for searching collections in their profiles by creating "pre-programmed" search criteria. To this end, all searches made in the system can be saved and assigned to a collection to be used later by any user given permission to use the collection. As may be appreciated, users can also save searches to user profiles or accounts without becoming contributors.

Take the following example. A category/subcategory selection tree 506 may be employed to select search data sets by category 230 and/or sub-category 112 to search within and to exclude from the search. Users may desire to search multiple categories 230 and sub-categories 112 at the same time. However, when adding multiple categories 230 and sub-categories 112 into a search data set, it is more likely that results will contain false positives (the more search data searched, the more false positives are possible). Search data set crossover may be employed to help eliminate this problem by selecting categories 230 and subcategories 112 to exclude content from the search results. Search data set crossover may include the same pieces of search data (e.g. web pages) occur in two different categories/subcategories.

As a non-limiting example, assume a user wants to refine a search for advanced topics on algebrasearch.site (or algebra.search.site). The user first clears the check box at the top of the category/subcategory tree 506 in front of the "All" category 230. This un-checks all the branches below. The user then checks the box to include the "Advanced" category 230. This automatically checks all of the branches below it corresponding to subcategories 112.

The user then un-checks the "Geometry" subcategory 112 because the user doesn't want that subcategory 112 included in the search set. Lastly, to better assure that no basic algebra content is included in the search result, the user double clicks the "Elementary" subcategory 112 setting it to out-checked. A large red minus sign now appears on that category branch and all of the subcategory branches below it. The reason the user needs to out-check the elementary category is because it is possible that some of the same search data included in the elementary category are also included in the advanced category. This happens when search data is in a "grey area" between categories and could possibly apply to both. The user may perform a "hard" search, where the user is willing to risk not seeing a search result that might apply to better the chances of eliminating false positives and, as a result, seeing search results that apply. With the amount of "grey content" on the Internet, the ability to perform a "hard search" is beneficial.

While the category/subcategory tree 506 usually has the same categories 230 and sub-categories 112 used in a categorized enhanced terms selector, they do not have to be the same. Methods of classifying search data sets can be different from the methods of classifying search terms. Many trees can be applied and change as necessary by domain (topic) and sub-domain (subtopic). The contributor tree 518b allows users to specify how contributor collections 232 of archived content 233 should be used in their search. Take the following examples. Contributor "Garfield" is a math professor at a University. Users can read his profile, see that he is a college professor, and elect to search just the search data that he has in his collections 232 of archived content 233 for college algebra using the collections "Algebra 101" and "Algebra 102."

Likewise, the search data in these collections 232 can also be given higher weight (or authority), making them surface to the top of the search results before results returned by the search that are not in the collection 232. Giving higher weight may be set as a default option. In this case, all other search data searched in the domain, sub-domain, category 230, subcategory 112, collections 232, etc., are pushed below the results returned in the search results from these collections and follow the normal authority ranking. However, while it may seem that there is no harm in searching all of the search data in a domain, sub-domain, category 230, subcategory 112, collections 232, etc., if they will just be tacked on to the end of the search results, that is not always the case. There are times when a user might not want to include search data in the search set that are not included in the collections searched. The most common cases for this is when a user wants to spare server resources and return search results faster. As may be appreciated, searching less data provides for faster response time.

Another example includes a user searching for college level algebra. The user may have entered the terms "college algebra" in the textbox 115 to retrieve results. However, to be certain that he does not receive search results that are particular to pre-algebra, he finds a contributor profile that has collections of pre-algebra search data. In this case, contributor "Randall" teaches pre-algebra at a middle-school. The user specifies that all collections 232 by contributor "Randal" be used to remove pre-algebra search data from the search results entirely or to give them lower authority in the search results, pushing them to the bottom (usually the better option). This is similar to the example above, except that rather than using category and subcategory branches in the category/subcategory tree 506, the user uses collection branches in the same manner.

Another example includes a user searching for college level algebra that includes geometry. A user may have entered the search term "Geometry" in the textbox 115. Further, the user has selected contributor "Garfield" collections "Algebra 101" and "Algebra 102" to search and to further add authority to any of the search data pieces returned in the search results that come from those collections. To further refine the search results, he selects all collections 232 in contributor "Randall" to give lower authority to any piece of search data in the search results that are contained in those search collections 232. Search data contained in "Randall" collections 232 may be pushed to the bottom of the result set if it is found in the search results.

Contributors can also be defined and selected in ways other than by specific profile. This allows users to select large numbers of contributors and their search collections 232 at a time without knowing anything specifically about the contributors. The result is that large amounts of search data can be searched or excluded from the results and the algorithm can give greater and/or lower authority to large amounts of search data in a single search. The following are some non-limiting example of defining contributors. Contributors who have created profiles and search collections 232 can be ranked by other contributors and users with a star rating (e.g., 1-5 stars) or other form of rating system as needed. Selecting contributors in this manner will add all search collections 232 in contributor profiles of a specific rating to the search data set for either inclusion or exclusion as specified.

In various embodiments, contributors can be classified by type. Types may include, for example, guides, professional, experts, laymen, anonymous, sponsored, etc. Guides may include people in charge of a domain (topic) and/or sub-domain (subtopic). These are usually the most active contributors, classifying large amounts of search data and collections for the system. Professionals may include contributors who have specific knowledge pertaining to the domain subject do to their profession. Professionals have the opportunity to verify their profiles as professionals, giving them more authority. These contributors are often more knowledgeable than guides, but are unlikely to contribute as much search data. Unlike most other types, Professionals are more likely to include professional resources in their search collections.

Experts include contributors that are highly knowledgeable, but are not professionals while laymen include neither professionals nor experts (e.g., contributors of search collections appropriate for simple subjects). Anonymous contributors may include contributors that did not have a profile when they contributed collections and/or ratings to and, as a result, are unable to be classified. In various embodiments, these contributors may have the lowest authority. Sponsored contributors are contributors, such as advertisers. In various embodiments, sponsored content may be shown in different positions and locations of a user interface 272 than non-sponsored content. Sponsored search collections are used for specific advertising purposes.

In addition, more trees may be employed in various embodiments as follows. A sub-domain selection tree may be employed to allow users to include and exclude specific sub-domains in the search. An attribute selection tree may be used to select the attributes that apply to the search data itself and the content within. Some of these attributes may include "content contains" (e.g., the web page or document itself contains references to people, places, things, ideas, actions, and/or descriptions (often reviews). Further, these attributes may include "search data popularity" which may include popularity defined in one of three ways: general (e.g., high, medium, and low—an average of all other methods), metrics (e.g., companies that rank websites (or search data) by popularity with ranges typically from 1 to 10,000,000 of the most popular websites), and commercial (e.g., search data that applies to businesses such as commercial websites, products, services providers, etc.) Businesses may be classified in several ways: size (e.g., small, medium, and large—accomplished in some embodiments as an average of the other methods), type (e.g., shopping, services, etc.), personal (e.g., search data that has content that pertains to people, social networks, or blogs), quality (e.g., a summary of the quality of a particular piece of search data), and/or technology (e.g., the technology used in website architecture).

According to various embodiments, search data quality may be determined based at least in part on professionalism and/or ratings. In some embodiments, professionalism can be identified based at least in part on contributors. For example, web page data can be detected by the use of themes, professional content management systems (CMS), code syntax, and identifiers that indicate the use of professional firms to design and build the website. Ratings may include rating-based metrics that have been assigned by contributors and/or other users.

A domain name filter tree 518c comprises domain names and domain information. In some embodiments, this tree may include top level domain (TLD) information including, but not limited to, domain extensions. The most common on the internet are .com, .net, and .org. In some embodiments, the domain names may be non-country specific or country specific. The tree may further comprise the age of a domain which can possibly give an indication of authority (the value of the content) as well as whether the domain owner chose to make their information is public or private (WHOIS Privacy). Further, the tree may comprise website similarity such as well-known websites (e.g., Facebook®, Twitter®, Wikipedia®, etc.). In some embodiments, the tree may include domain or sub-domain websites.

Figure 6:
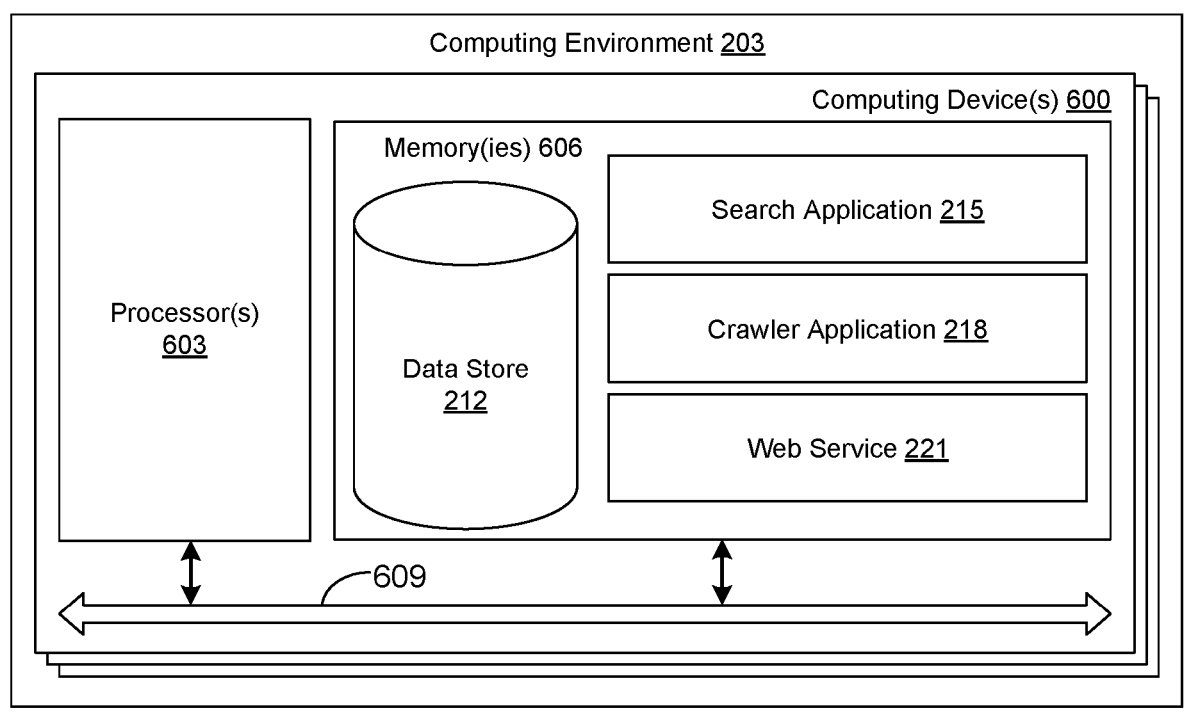
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 506, both of which are coupled to a local interface 509. To this end, each computing device 600 may comprise, for example, at least one server computer or like device. The local interface 509 may comprise, for example, a data bus with an accompanying address/control bus or other bus structure as can be appreciated.

Stored in the memory 506 are both data and several components that are executable by the processor 603. In particular, stored in the memory 506 and executable by the processor 603 are the search application 215, the crawler application 218, and potentially other applications. Also stored in the memory 506 may be a data store 212 and other data. In addition, an operating system may be stored in the memory 506 and executable by the processor 603.

It is understood that there may be other applications that are stored in the memory 506 and are executable by the processor 603 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 506 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 506 and run by the processor 603, source code that may be expressed in proper format such as object code that is capable of being loaded into a random access portion of the memory 506 and executed by the processor 603, or source code that may be interpreted by another executable program to generate instructions in a random access portion of the memory 506 to be executed by the processor 603, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 506 may represent multiple memories 506 that operate in parallel processing circuits, respectively. In such a case, the local interface 509 may be an appropriate network that facilitates communication between any two of the multiple processors 603, between any processor 603 and any of the memories 506, or between any two of the memories 506, etc. The local interface 509 may comprise additional systems designed to coordinate this communication, including, for example, performing load balancing. The processor 603 may be of electrical or of some other available construction.

Although the search application 215, the crawler application 218, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The various embodiments herein may be used in association with a structure-based search or search engine, e.g., with data that is organized in structures of domains, subdomains, categories, subcategories, collections, patterns and relationships between these structures, etc., which can be used to generate search results having search data ranking authority. Additionally, in various embodiments, the these structures may employ the following relationships.

Groups may consist of domains (topics) and sub-domains (sub-topics). For example, algebra and geometry are related because they are both types of mathematics. Therefore, we can say that they are in the same group, or subject, (i.e., mathematics). A website may be identified within multiple domains (topics) and/or sub-domains (sub-topics) while being in the same group. For example, if a website has been identified to apply to algebra and geometry, it can be ascertained with reasonable certainty that this website has been properly identified as a mathematics website. Therefore, it can be assigned higher authority for searches related to mathematics. Conversely, if a website was identified as a website that applied to the algebra domain and the entertainment domain, it is more likely that this website is a general type of website that is not highly applicable to either domain. The website would be flagged for inspection and properly categorized using other methods. Until inspected, that website would be given lower authority for both domains.

Categories and sub-categories are structures that occur within domains (topics) and sub-domains (sub-topics.) By creating categories and sub-categories, authority for a website can be further established. The more categories and sub-categories a website has been identified with the greater the authority. Further, in the event that a website has been identified with conflicting domains (e.g., algebra and entertainment), categories and sub-categories can often solve the conflict as the domain that has the website registered in the most categories and sub-categories may include the domain that it most likely applies to and, as a result, should receive higher authority.

Contributor collections may include crowdsourcing search collections. A contributor may select a website and/or web page for a collection. A contributor profile can include information such as profession, education, and other details that give an indication as to his or her level of expertise in the subject matter. A type may also be assigned to the contributor. A number of times that users have selected and searched using the collections and the nature of the use of the collections in that search may be ascertained. Additionally, ratings may be determined for the contributor. For example, the contributor "Garfield," having created a profile," may indicate that he is a college professor and he teaches mathematics. Assuming he has created collections on the topics "Algebra 101" and "Algebra 102," these collections may reside within the mathematics classification and the domain algebra with the sub-domain of college algebra. Further, the profiles may be verified as verified profiles are more reliable and carry higher authority. Contributors and their collections are considered more reliable the more they are used by legitimate users.

Users who have profiles increase the authority of what they use. Many of the users of the "Garfield" collections may include his students who have created profiles of their own so that they may take advantage of user features. In the process, these users may be identified as being legitimate users. Anonymous users can increase authority, but at a much lower rate because they are considered less reliable. The more the "Garfield" collections are used, the more authority they establish and, in turn, the more authority the websites within the collections establish.

The "Garfield" collections may be highly specific pertaining to particular domains and sub-domains making the websites and/or web pages within those collections well classified. Because the contributor is reliable and the collections are well classified, these websites may carry higher authority. Contributors can also score websites within collections which may be used to factor authority. For example, highly scored websites may be given higher authority than un-scored websites.

In various embodiments, users can elect to turn parts of the algorithms on and off or even turn it off entirely. For example, a user may wish to use only the domain or sub-domain portions of the algorithm to assign authority and exclude other factors like those that apply to web pages (like when a web page has been included often in collections or highly rated which would ordinarily increase authority). These options are often represented by three state check box trees, but some options may include other forms of representation. Turning the algorithm off essentially puts the search engine into text search only mode. Turning off the algorithm can be useful for searching very unique pieces of text.

In various embodiments case, the user can customize how results are ordered. Examples of how to order results in this case would include attributes like number of times found, position on the page, etc. Customizations can become extensive and can even apply to other portions of the search results, giving granular level control to the user to choose just how results are displayed.

In various embodiments, the user may turn on and off features found in the search engine. Some of the features may include stemming (e.g., the practice of modifying search terms to include variations from the root like "ing," "ed," etc. In some embodiments, stemming may be turned on by default, although there may be times when a user desires to turn off stemming, such as when an exact search is being performed on a word that could be stemmed. Other features include spelling auto-correction, which automatically searches the proper spelling of a term entered in the search. In some embodiments, this is enabled by default, although urning it off may be necessary when a correctly spelled term is being misinterpreted as being misspelled. Other features include special presentation search add-ons. In some scenarios, there is information that should be added into the search that may require a special method of presentation and/or is important enough to mention separately from a term selector or guides. This section often contains a collection of special input fields, drop-down boxes, radio-buttons (two state) or three state check boxes for users to add specific information to the search. Common add-ons include, but are not limited to, domain character input field (specifies words or characters in the domain name to require or exclude) and/or domain length (the minimum or maximum number of characters in the domain). Domain length may be a very useful tool for finding web pages that are typically hard to find in engines like Google® and Bing® that penalize websites with long domain names.

In various embodiments, a sub-domains tab or other user interface component may be configured to list the sub-domains that have been customized for that domain. For example, each sub-domain listing may have the following features: sub-domain description and information (e.g., a definition and description of the sub-domain), sub-domain inclusion/exclusion (user-specified command whether sub-domains should be included or excluded in a search), and/or sub-domain summaries (e.g., summary of such criteria as categories/subcategories in the sub-domain, number of contributors, popularity of sub-domain, available options, etc.).

The tools tab or other user interface component may be configured to list what are primarily text entry tools that useful for mobile devices. For example, these tools may include most common words in the language specified (e.g., clicking on a word enters it into the search bar), domain/sub-domain most common words (e.g., alphabetized list of the most common words that are highly specific to the domain/sub-domain excluding the most common words), and/or a virtual keyboard.

The data set collection assembly applies to one or more user interfaces 272 for search results. The components of these user interfaces 272 may include i-frames, category/subcategory trees, and/or results collections. I-frames may be employed to view and interact with results without going to the page, if possible. I-frames can also be scaled to the available device screen size, if desired. If a result website is configured to prohibit its display in blocks or i-frames, screenshots may be employed to show the page. In various embodiments, the screenshots may be made dynamic by encoding URLs in or animating certain portions of the screenshot. The i-frames and/or screenshots may be shown under a result row, for example, when the viewer symbol is clicked or otherwise manipulated. This view may remain open for that result, until closed by the user. This allows users to view and interact with the result website while remaining on the search results user interface 272.

The category/subcategory tree 506 allows the result to be categorized/sub-categorized by tree as opposed to an addition and/or subtraction button, thereby giving the ability to select multiple categories 230 and subcategories 112. By clicking on the category symbol, a pop-up box or other dialog may be triggered that contains the category/subcategory tree 506 and/or a quick add/subtract button that allows the user to customized the categories 230 and sub-categories 112 used in the search as opposed to checking/un-checking multiple branches in the tree (which could become very time consuming).

A clip button or other component may "clip" search result information to a clipboard tab of the results. The clipped search result information may be used to create a collection, in various embodiments. Further, collections may be created dynamically or "on the fly" to quickly collect and organize large amounts of search data to be used in subsequent structured searches. In addition to saving collections to their profile stored remotely in the data store 212, contributors can save these results to a file on their local computer.

The flowchart of FIG. 4 shows the functionality and operation of an implementation of portions of the search application 215. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 4 shows a specific order of execution, it is understood that the order of execution may differ from that which is depicted. For example, the order of execution of two or more blocks may be scrambled relative to the order shown. Also, two or more blocks shown in succession in FIG. 4 may be executed concurrently or with partial concurrence. Further, in some embodiments, one or more of the blocks shown in FIG. 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the search application 215 and the crawler application 218, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the search application 215 and the crawler application 218, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device comprising a hardware processor;
   a data store in data communication with the at least one computing device, the data store having stored thereon a plurality of categories and a plurality of subcategories;
   a search application executed in the at least one computing device, the search application comprising logic that:
     receives a request for user interface data from a client device in response to the client device attempting to access a domain;
     parses the domain to identify a search category corresponding to one of the categories stored in the data store;
     identifies at least a portion of the subcategories that are associated with the search category; and
     generates the user interface data that causes the at least a portion of the subcategories associated with a search component to be rendered in a display of the client device, wherein the search component is configured to use a selected one of the at least a portion of the subcategories to narrow a search conducted using the search component.

2. The system of claim 1, wherein the search application further comprises logic that:
   receives a search request from the client device comprising at least a search string;
   searches a plurality of collections of archived web content to identify at least one network address associated with the search request, wherein each of the collections are defined by a contributor of the search application; and
   generates additional user interface data that causes the at least one network address to be rendered in the display associated with the client device.

3. The system of claim 1, wherein the request for the user interface data received from the client device is initiated by a browser application executed in the client device.

4. The system of claim 1, wherein the search component in the user interface data further comprises a dropdown menu comprising at least a portion of the subcategories and a textbox configured to capture a search string.

5. The system of claim 4, wherein the search application further comprises logic that:
receives a search request from the client device comprising the search string;
searches a database of archived web content to identify at least one network address associated with the search request and a selected one of the subcategories selected via the dropdown menu; and
generates additional user interface data that causes the at least one network address to be rendered in the display associated with the client device.

6. The system of claim 1, wherein the request for the user interface data from the client device comprises at least a uniform resource locator (URL).

7. The system of claim 6, wherein the search application further comprises logic that decrypts at least a portion of the URL prior to parsing the domain to identify the search category.

8. A non-transitory computer-readable medium embodying a search program executable in at least one computing device, comprising code that:
receives a request for user interface data from a client device in response to the client device attempting to access a domain;
parses the domain to identify a search category corresponding to one of the categories stored in a data store;
identifies at least a portion of a plurality of subcategories that are associated with the search category; and
generates the user interface data that causes the at least a portion of the subcategories associated with a search component to be rendered in a display of the client device, wherein the search component is configured to use a selected one of the at least a portion of the subcategories to narrow a search conducted using the search component.

9. The non-transitory computer-readable medium of claim 8, wherein the program further comprises code that:
receives a search request from the client device comprising at least a search string;
searches at least one of a plurality of collections of archived web content to identify at least one network address associated with the search request, wherein each of the collections are defined by a contributor of the search application and stored in the data store separate from other ones of the collections; and
generates additional user interface data that causes the at least one network address to be rendered in the display associated with the client device.

10. The non-transitory computer-readable medium of claim 8, wherein the request for the user interface data received from the client device is initiated by a browser application executed in the client device.

11. The non-transitory computer-readable medium of claim 8, wherein the search component in the user interface data further comprises a dropdown menu comprising at least a portion of the subcategories and a textbox configured to capture a search string.

12. The non-transitory computer-readable medium of claim 11, wherein the program further comprises code that:
receives a search request from the client device comprising the search string;
searches a database of archived web content to identify at least one network address associated with the search request and a selected one of the subcategories selected via the dropdown menu; and
generates additional user interface data that causes the at least one network address to be rendered in the display associated with the client device.

13. The non-transitory computer-readable medium of claim 8, wherein the request for the user interface data from the client device comprises at least a uniform resource locator (URL).

14. The non-transitory computer-readable medium of claim 13, wherein the program further comprises code that decrypts at least a portion of the URL prior to parsing the domain to identify the search category.

15. A computer-implemented method, comprising:
receiving, by at least one computing device, a request for user interface data from a client device in response to the client device attempting to access a domain, wherein the at least one computing device comprises at least one hardware processor;
parsing, by the at least one computing device, the domain to identify a search category corresponding to one of the categories stored in the data store;
identifying, by the at least one computing device, at least a portion of a plurality of subcategories that are associated with the search category; and
generating, by the at least one computing device, the user interface data that causes the at least a portion of the subcategories associated with a search component to be rendered in a display of the client device, wherein the search component is configured to use a selected one of the at least a portion of the subcategories to narrow a search conducted using the search component.

16. The computer-implemented method of claim 15, further comprising:
receiving, by the at least one computing device, a search request from the client device comprising at least a search string;
searching, by the at least one computing device, at least one of a plurality of collections of archived web content stored in the data store to identify at least one network address associated with the search request wherein each of the collections of archived web content are defined by a contributor of the search application and stored in the data store separate from other ones of the collections; and
generating, by the at least one computing device, additional user interface data that causes the at least one network address to be rendered in the display associated with the client device.

17. The computer-implemented method of claim 15, wherein the request for the user interface data received from the client device is initiated by a browser application executed in the client device.

18. The computer-implemented method of claim 15, wherein the search component in the user interface data further comprises a dropdown menu comprising at least a portion of the subcategories and a textbox configured to capture a search string.

19. The computer-implemented method of claim 18, further comprising:
receiving, by the at least one computing device, a search request from the client device comprising the search string;
searching, by the at least one computing device, a database of archived web content to identify at least one network address associated with the search request and a selected one of the subcategories selected via the dropdown menu; and generating, by the at least one computing device, additional user interface data that causes the at least one network address to be rendered in the display associated with the client device.

20. The computer-implemented method of claim 15, wherein:
the request for the user interface data from the client device comprises at least a uniform resource locator (URL); and
the program further comprises code that decrypts at least a portion of the URL prior to parsing the domain to identify the search category.

* * * * *